(12) United States Patent
Pekkarinen

(10) Patent No.: US 6,553,007 B1
(45) Date of Patent: Apr. 22, 2003

(54) COMPENSATION OF DOPPLER SHIFT IN A MOBILE COMMUNICATION SYSTEM

(75) Inventor: Julie Pekkarinen, Oulu (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/521,760

(22) Filed: Mar. 9, 2000

Related U.S. Application Data

(63) Continuation of application No. PCT/EP99/04926, filed on Jul. 8, 1999.

(30) Foreign Application Priority Data

Jul. 17, 1998 (GB) .............................. 9815656

(51) Int. Cl.$^7$ ............................ H04B 7/00; H04B 7/01
(52) U.S. Cl. ................... 370/310; 370/345; 370/465; 370/913; 342/99; 342/161; 342/171
(58) Field of Search ................... 342/99, 161, 171; 370/204, 206, 252, 310, 345, 464, 465, 498, 912, 913; 375/229, 231, 322, 329, 344

(56) References Cited

U.S. PATENT DOCUMENTS 3,602,812 A * 8/1971 Paradise ..................... 324/85
3,715,663 A * 2/1973 Laughlin et al. ................ 325/4
3,864,634 A * 2/1975 Dragonetti ................... 325/419
4,942,404 A * 7/1990 Kefer ........................ 342/418
5,095,538 A * 3/1992 Durboraw, III ............... 455/71
5,696,797 A * 12/1997 Bucher et al. ............... 375/344
5,729,558 A * 3/1998 Mobin ......................... 371/43

FOREIGN PATENT DOCUMENTS

| EP | 0 534 399 | 3/1993 |
| EP | 0 618 687 | 10/1994 |
| EP | 0 731 587 | 9/1996 |
| WO | 98/34358 | 8/1998 |

OTHER PUBLICATIONS

10/99 International Search Report for PCT/EP99/04926.

* cited by examiner

*Primary Examiner*—Hassan Kizou
*Assistant Examiner*—Joe Logsdon
(74) *Attorney, Agent, or Firm*—Squire, Sanders & Dempsey LLP

(57) ABSTRACT

The present invention relates to a method and a system for compensating for doppler shift in a signal transmitted between a mobile station and a base station in a mobile communication system. In the method the doppler characteristic is determined for two selected portions of the received signal, the doppler characteristic being in the form of a phased offset for each selected portion. The larger phase offset is them used as a doppler characteristic to provide a doppler shift compensation for the received signal.

10 Claims, 2 Drawing Sheets

COMPENSATION OF DOPPLER SHIFT IN A MOBILE COMMUNICATION SYSTEM

This is a continuation of application Ser. No. PCT/EP99/04926 filed Jul. 8, 1999.

FIELD OF THE INVENTION

The present invention relates to compensation of Doppler shift in a mobile communication station.

BACKGROUND OF THE INVENTION

In a mobile communication system, signals which are transmitted from mobile stations moving relative to a base station are subject to the well-known Doppler effect, which causes a frequency shift in the frequency received at the base station relative to that which was transmitted by the mobile station. This frequency shift is referred to herein as the Doppler shift. The Doppler shift is dependent upon the speed and direction of movement of the mobile station relative to the base station. Thus, the Doppler effect can provide an increase or a decrease in the frequency, depending on the direction of movement of the mobile station relative to the base station. The magnitude of the Doppler shift is dependent on the speed with which the mobile station is moving relative to the base station.

Existing mobile communication installations provide a form of Doppler compensation, in that the frequency detection circuitry within the base station which selects a particular signal on a particular channel can take into account a certain amount of Doppler shift in the signal.

A technique for implementing Doppler compensation is described in our earlier Application PCT/EP97/00489.

That technique is implemented by the following steps:
determining a channel impulse response for the channel on which the signal is received;
using the channel impulse response to estimate data bits of a selected portion of the received signal;
generating a reference vector using the channel impulse response and the estimated bits;
determining a Doppler characteristic using the reference vector and the selected portion of the received signal; and
using the Doppler characteristic to provide a Doppler shift compensation for the received signal.

Doppler shift can cause particular difficulties in the detection of signals transmitted from a fast moving mobile. If the Doppler shift can be corrected then the received signal can be detected more accurately.

SUMMARY OF THE INVENTION

The present invention relates to an improvement on the above-referenced technique which is intended to provide a Doppler correction method which performs well regardless of the speed of the mobile station. At low mobile velocities there is little Doppler shift therefore correction can degrade performance. However, at high velocities correction is required to improve signal detection. The present inventor has found a compromise so that for high mobile velocities, the receiver performance is improved and conversely at low mobile velocities the performance degradation is minimum.

According to one aspect of the present invention there is provided a method for compensating for Doppler shift in a signal transmitted between a mobile station and a base station in a mobile communication system, the method comprising:

determining a Doppler characteristic for two selected portions of the received signal, the Doppler characteristic being in the form of a phase offset for each selected portion; and using the larger phase offset as a Doppler characteristic to provide a Doppler shift compensation for the received signal.

According to another aspect of the present invention there is provided a system for compensating for Doppler shift in a signal transmitted between a mobile station and a base station in a mobile communication system, the system comprising:

circuitry for determining a Doppler characteristic for two selected portions of the received signal, the Doppler characteristic being in the form of a phase offset for each portion; and circuitry for implementing a Doppler shift compensation on the basis of the larger phase offset as a Doppler characteristic for the received signal.

It has been found surprisingly that by always taking the larger phase offset, there is an improvement in signal estimation for the received signal. The selected portions of the received signal may be distinct or overlapping. In the described embodiment, one selected portion is close to the central part of the received signal, and the other selected portion is remote from the central part, but there are many other possibilities for location of the selected portions.

Moreover, it is possible to take more than two selected portions and to take the larger offset over three or more selected portions as the Doppler characteristic used to implement Doppler shift compensation.

The Doppler characteristic may be determined using a reference vector which has been generated using a channel impulse response determined for the channel on which the signal is received and estimated data bits which have been estimated using the channel impulse response. This is in line with the technique described in our earlier Application PCT/EP97/00489.

BRIEF DESCRIPTION OF THE DRAWINGS

For a better understanding of the present invention and to show how the same may be carried into effect, reference will now be made by way of example to the accompanying drawings in which.

DESCRIPTION OF PREFERRED EMBODIMENTS OF THE INVENTION

Figure 1:
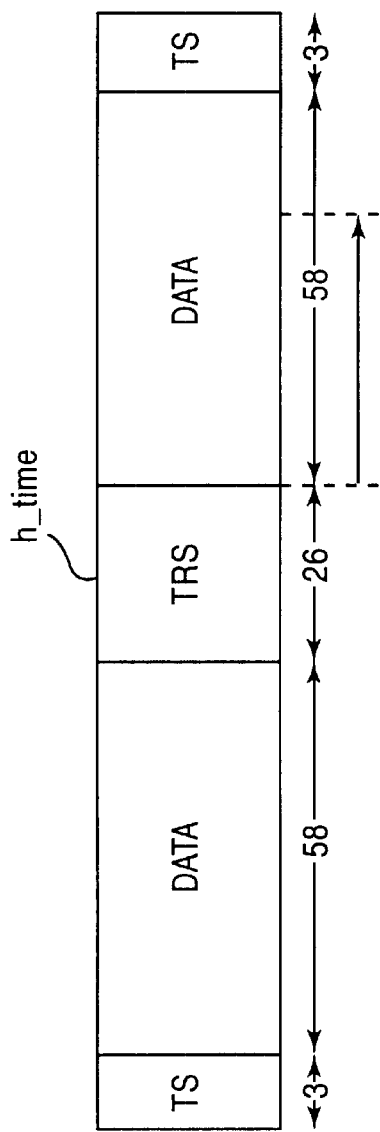
FIG. 1 is a diagram of a signal burst in a mobile communication system.

FIG. 1 illustrates a normal burst in a mobile communication system according to the GSM standard. This figure represents a burst received at a base station. For a TDMA system according to the GSM standard, mobile stations transmit these bursts as modulated signals on frequency channels allocated by a base station controller. One frequency channel may support up to eight bursts, each burst associated with a respective call, where each call is allocated a time slot in which to send the burst. Further details of a TDMA system according to the GSM standard are not described herein because they are known to a person skilled in the art.

The normal burst contains two packets of 58 bits (DATA) surrounding a training sequence (TRS) of 26 bits. Three tail bits (TS) are added at each end of the normal burst. The training sequence (TRS) is a predetermined sequence of bits which is sent by the mobile station (MS) and is known at the base station controller (BSC). It is utilised at the base station to estimate the impulse response of the channel over which the burst is sent. The actual information which is transmitted is located in the data bits (DATA) of the burst.

As explained earlier, the environment through which a signal passes from a mobile station to a base station can vary considerably, depending, amongst other things, on the distance between the mobile station and the base station, and interference caused by buildings and other structures in the area. As a result, the signal strength and signal quality of the signal received at the base station varies widely. Moreover, for moving mobile stations, the signal received by the base station is subject to a Doppler shift which should be corrected.

The circuit described herein provides a Doppler shift correction technique which can be used independent of the speed of the mobile station.

Figure 2:
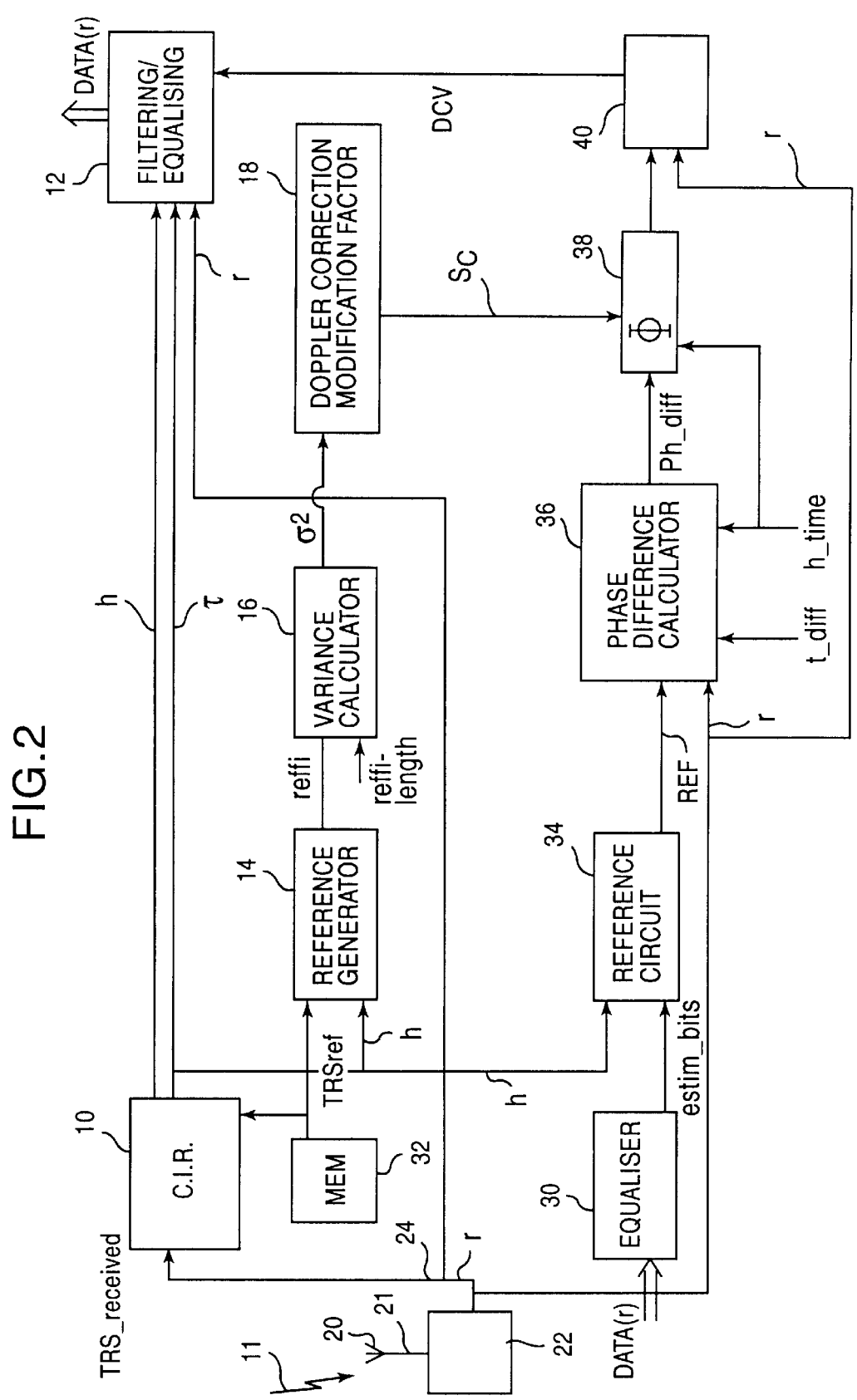
FIG. 2 is a block diagram of circuitry for implementing modified Doppler shift compensation.

FIG. 2 illustrates a circuit 1 suitable for implementing a Doppler compensation in a GSM system. It should be understood that the various blocks in FIG. 2, although illustrated as separate interconnected entities, do not necessarily represent separate physical entities, but are intended to represent diagrammatically the various steps which are carried out. The blocks could be implemented as circuits or a suitably programmed microprocessor may effect each of the functions which is individually assigned to the blocks.

An antenna 20 receives signals 11 from the mobile stations. The antenna 20 is connected, via an interconnect 21, to RF circuitry 22. This circuitry 22 operates on the received burst to downshift the frequency to the baseband frequency and to sample the burst to provide from the analogue signal digital sampled values. The output of RF circuitry 22 is a sampled burst r (in digital form), sampled at the expected bit rate of the transmitted signal. FIG. 1 illustrates such a burst. The output of circuitry 22 is supplied along line 24 to a channel impulse response (C.I.R.) block 10, to a variance calculator 16 to enable estimation of the quality of the communication channel (as described later), to filtering and equalisation circuitry 12, to a phase difference calculator 36 and to transforming circuitry 40 to enable the estimation and application of a Doppler shift correction to the burst r.

The top part of FIG. 2 illustrates the circuitry required for implementing an adaptive part of the system, to generate a Doppler correction modification factor $S_c$. A memory 32 holds the training sequence TRSref which is the predetermined sequence of bits which is sent by the mobile station MS as a training sequence and received at the base station as TRS_received. The reference training sequence TRSref is supplied to a reference generator 14 and to the channel impulse response (C.I.R.) block 10. The reference generator 14 also receives the estimated channel impulse response h from the channel impulse response block 10.

The C.I.R. block 10 receives the burst r, including the received training sequence TRS_received and calculates an estimated channel impulse response h by calculating the cross correlation between the received training sequence TRSreceived and the known training sequence TRSref.So, $$h = .xcorr\ (TRS\_received,\ TRSref) \quad \text{(equation 1)}$$

It will be appreciated that, prior to effecting the cross correlation, the known training sequence TRSref, which is stored in digital form, is i,q modulated similarly to the manner in which the training sequence has been modulated at the MS for transmission, according to the GSM standard. The cross correlation is done in a known manner to produce a channel impulse response in the form of five tap values $(h(i)_{i=0 to 4})$.

As is known, the estimated impulse response h is used to calculate the expected estimate of the data in the received burst, as though the data has been subject to the same average noise.

The C.I.R. block also generates timing advance information τ, which is used to determine where in the allocated time slot the received burst r is located.

For each burst, the estimated channel impulse response h for that burst is calculated by the CIR block 10 and is supplied to filtering/equalising circuitry which allows the data, DATA(r), in that burst to be recovered. As is known, the filtering/equalising circuit 12 receives the channel impulse response h and timing information τ for the received burst to allow the signal to be demodulated, filtered and decoded, to recover the data in a known manner.

The reference generator 14 produces a reference vector, reffi, which is calculated using the convolution of the impulse response and the known training sequence. Thus, the reference generator 14 performs the following calculation:

$$\text{reffi} = h*\text{TRSref} \quad \text{(equation 2)}$$

In more detail, (where $\text{reffi}_k$ represents the kth sample of the signal reffi)

$$\text{reffi}_k = \sum_{i=0}^{N-1} h_i \cdot (1 - 2.TRS_{k-i}) \quad \text{(equation 3)}$$

in which N represents the number of tap values in the estimated impulse response h (N=5 in the described embodiment), and k runs from N−1 to 25.

The vector reffi is supplied from the reference generator to the variance calculator 16. As described above, the variance calculator also receives the burst r, including the received training sequence. The variance calculator calculates a variance var ($\sigma^2$) according to the following equation:

$$\text{var} = \frac{\left( \sum_{k=4}^{25} (|r_k - \text{reffi}_k|^2) \right)}{\text{reffi\_length}} \quad \text{(equation 4)}$$

The term reffi_length is a constant representing the length of the reference signal, reffi. This is calculated by multiplying the number of samples (22) by the bit separation.

In equation 4, the values of $r_k$ are the sampled values of the received training sequence for the burst r.

It will be appreciated that each actual received sample $r_k$ will have a noise level which is different to the averaged estimated noise level derived from the channel impulse response and reflected in the reference samples $\text{reffi}_k$. Thus, the variance gives an indication of the level of noise energy actually received, and thus signal quality.

The output $\sigma^2$ of the variance calculator 16 is supplied to a Doppler correction modification factor circuit 18. The Doppler correction modification factor circuit 18 uses the calculated variance $\sigma^2$ to generate a modification factor $S_c$ using a function which can be determined by a user. In the embodiment shown in FIG. 2, the Doppler correction modification factor circuit generates the modification $S_c$ as a function of the variance $\sigma^2$, for example a linear function or a non-linear function such as a step function.

In another embodiment the value of $S_c$ can be calculated in dependence upon a signal to noise ratio (SNR) of the channel.

The lower part of the circuit in FIG. 2 illustrates in block diagram form a system for implementing a Doppler shift correction.

An equalisation circuit 30, for example a Viterbi equaliser, receives the filtered, demodulated and equalised signal DATA(r) from the filtering and equalisation circuitry 12. The equalisation circuit 30 operates on two selected portions of the data sequence DATA of the burst (these portions being designated ESTIM.BLK1 and ESTIM-BLK2 in FIG. 3) to estimate bits from the data which was sent from the mobile station MS. This data is referred to herein as estim_bits, and they run from k=j to k=j+n in BLK1. The procedure will be described in connection with BLK1 but it will be appreciated that a similar procedure is conducted for BLK2. The equalisation circuit 30 operates to make decisions of the bits as in known mobile communication systems and thus it will not be described further herein.

The estimated bit decisions estim_bits are supplied to a reference circuit 34. The reference circuit 34 generates a reference vector ref by using a convolution of the estimated bit decisions and the estimated impulse response h, according to the following equation:

$$\text{ref} = \text{estim\_bits} * h \quad \text{(equation 5)}$$

Thus, the reference vector ref comprises a set of samples $\text{ref}_k$, $k=j \rightarrow j+n$ each having real and imaginary values. The reference vector ref is supplied to a phase difference calculator 36. As described earlier, the phase difference calculator 36 also receives the received burst r. As known in the art, the received burst comprises samples $r_k$ each having real and imaginary values.

Figure 3:
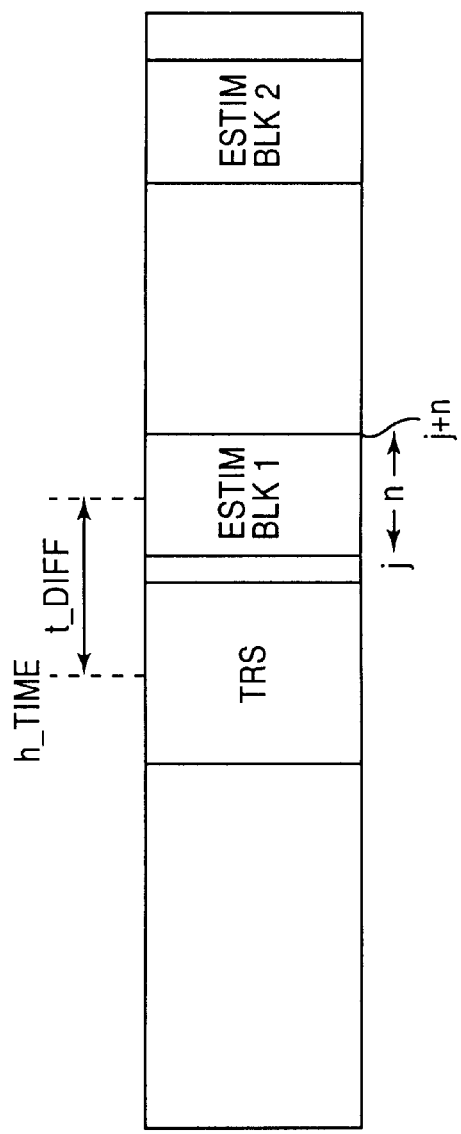
FIG. 3 is another diagram of a signal burst showing more than one selected portion.

The phase difference calculator uses a value t_diff which represents the time between a zero phase offset point h_time and the middle of the estimation block blk1, as illustrated in FIG. 3. The zero phase offset point h_time is a zero phase offset point inside the training sequence where the calculated impulse response is true. In practice, this is typically the middle of the training sequence. The value of t_diff and h_time can be determined during the design phase of the system, and a constant thereafter. Of course, they could be reprogrammed if necessary during use of the system.

In addition, the location (j) of the beginning of the estimation blocks estim blks 1 and 2 and their length (n) is determined and programmed into the equalisation circuit 30. In the described embodiment, the estimation blocks are chosen adjacent and remote from the training sequence respectively.

The phase change per bit duration (ph_diff) resulting from the Doppler effect (the Doppler characteristic) is calculated from the reference signal ref and the actual received signal r by the phase difference calculator 36 according to one of the following equations:

$$\text{ph\_diff} = \frac{1}{\text{t\_diff}} \tan^{-1} \left\{ \frac{\sum_k \text{imag}(r_k \cdot \text{ref}_k^*)}{\sum_k \text{real}(r_k \cdot \text{ref}_k^*)} \right\} \quad \text{(equation 6)}$$

$$\text{ph\_diff} = \frac{1}{\text{t\_diff}} \sum_k \cdot \tan^{-1} \left\{ \frac{\text{imag}(r_k \cdot \text{ref}_k^*)}{\text{real}(r_k \cdot \text{ref}_k^*)} \right\} / \text{length}(k) \quad \text{(equation 7)}$$

where k runs from j to j+n, and where length (k) represents the amount of different k values in the summation, i.e. n.

This calculation is effected for each estimation block and the larger value of ph_diff is determined by a comparator.

A Doppler correction circuit 38 is then used to correct the estimated Doppler shift from the received samples. The Doppler correction circuit 38 receives the zero phase offset point h_time and the Doppler correction modification factor $S_c$. Furthermore, it receives the greater of the two calculated phase differences for the two estimation blocks, ph_diff max, from the phase difference calculator 36. Knowing that the point h_time has zero phase offset, the actual Doppler phase shift $\phi$ can be calculated for each bit as follows:

$$\phi k = S_c \cdot \text{ph\_diff max} \cdot (k - h\_\text{time}) \quad \text{(equation 8)}$$

where k is a bit index of the received sample r. When the index k<h_time the phase shift has an opposite sign to when k>h_time.

Transforming circuitry 40 is then used to implement the Doppler shift correction on the whole received burst r to produce a corrected signal. The transforming circuitry receives the estimated Doppler shift vector $\phi$ (comprising the $\phi_k$ values) and sampled values of the received burst r. It performs a CORDIC operation to correct for the Doppler shift of each sample, according to the following operator.

$$\begin{pmatrix} \text{N\_real\_sample}(k) \\ \text{N\_imag\_sample}(k) \end{pmatrix} = \begin{pmatrix} \cos\phi_k & -\sin\phi_k \\ \sin\phi_k & \cos\phi_k \end{pmatrix} \begin{pmatrix} \text{real}(r_k) \\ \text{imag}(r_k) \end{pmatrix} \quad \text{(equation 9)}$$

The Doppler shift corrected vector DCV which is output from the transforming circuitry 40 is supplied to the filtering/equalising circuit 12, so that the Doppler corrected signal is used to recover the data from the signal.

As part of the Doppler correction technique described above, bit decisions for the estimation blocks have already been made. These constitute part of the data. It is thus not necessary to estimate the same bits again, although this could be done. Instead, the equalisation circuit 30 can be stopped at the end of the estimation block and the current state preserved. Next, the Doppler correction is performed for the remaining bits and the Viterbi equalisation is then executed to the end of the time slot on the Doppler corrected bits. In the second part, the Doppler correction may be done to the first part of the time slot and the Viterbi estimation can then be performed for the data in the first part of the time slot. This method reduces the required calculations in the receiver.

It is possible to implement a limit on the value of the phase difference ph_diff, so that if the phase difference is below a certain threshold, no correction is performed.

A typical environment where Doppler correction could be used is fast trains or motorways. In that situation, it is likely that there would be a line of sight path from the base station to the mobile station, so that the Doppler correction would be a constant value between different time slots if the velocity of the mobile station is the same. In that case, an average value of the maximum phase difference could be calculated from several different time slots, and this average value could be used as a correction value.

In the case of a diversity receiver having a plurality of different branches, the phase differences can be calculated for all branches using the same estimates as the received samples, with each branch using its own impulse response.

The idea underlying the above-described technique is that if the estimate is taken only at one position in the burst then it favours either fast or slow moving mobiles. In this new method, one estimation is taken close to the training sequence and the other at the end of the burst so that the optimal estimate is made regardless of mobile velocity.

What is claimed is:

1. A method for compensating for Doppler shift in a signal transmitted between a mobile station and a base station in a mobile communication system, the method comprising:

determining a Doppler characteristic for two selected portions of a received signal, the Doppler characteristic being in the form of a phase offset for each selected portion;

comparing the phase offset for each selected portion to determine a larger phase offset; and using the larger phase offset as a Doppler characteristic to provide a Doppler shift compensation for the received signal.

2. A method according to claim 1, wherein the received signal comprises one of a sequence of bursts in a time division communication system.

3. A method according to claim 2, wherein each burst comprises a training sequence located centrally of the burst and wherein the two selected portions are located on a same side of the training sequence within the burst.

4. A method according to claim 3, wherein the two selected portions are respectively adjacent to and remote from the training sequence.

5. A method according to claim 3, wherein the two selected portions are overlapping.

6. A method according to claim 1, wherein the Doppler characteristic is determined using a reference vector which is generated from a channel impulse response and estimated data bits, wherein the channel impulse response is determined for a channel on which the signal is received and the estimated data bits of the selected portions of the received signal are estimated using the channel impulse response.

7. A system for compensating for Doppler shift in a signal transmitted between a mobile station and a base station in a mobile communication system, the system comprising:

circuitry for determining a Doppler characteristic for two selected portions of a received signal, the Doppler characteristic being in the form of a phase offset for each portion;

circuitry for comparing the phase offset for each selected portion to determine a larger phase offset; and circuitry for implementing a Doppler shift compensation on a basis of the larger phase offset as a Doppler characteristic for the received signal.

8. A system according to claim 7, which comprises means for selecting said portions in a communication system in which the received signal comprises one of a sequence of bursts, each burst including a training sequence located centrally of the burst, wherein the two selected portions are located on a same side of the training sequence.

9. A system according to claim 8, wherein said means for selecting said portions select said portions respectively adjacent to and remote from said training sequence.

10. A system according to claim 8, wherein said means for selecting said portions selects overlapping portions.

* * * * *